(12) United States Patent
Kerr, Sr.

(10) Patent No.: US 6,966,168 B1
(45) Date of Patent: Nov. 22, 2005

(54) TRIMMER CADDIE FOR MOWER DECK

(75) Inventor: John Patrick Kerr, Sr., Paducah, KY (US)

(73) Assignee: J. Patrick Kerr, Sr., Paducah, KY (US)

( * ) Notice: Subject to any disclaimer, the term of this patent is extended or adjusted under 35 U.S.C. 154(b) by 0 days.

(21) Appl. No.: 10/458,611

(22) Filed: Jun. 10, 2003

Related U.S. Application Data

(60) Provisional application No. 60/386,857, filed on Jun. 10, 2002, provisional application No. 60/402,594, filed on Aug. 12, 2002, provisional application No. 60/426,787, filed on Nov. 18, 2002.

(51) Int. Cl.[7] .............................................. A01D 34/00
(52) U.S. Cl. ..................................................... 56/12.7
(58) Field of Search .......................... 30/276; 56/13.6, 56/12.1, 12.7, 16.9, DIG. 9

(56) References Cited

U.S. PATENT DOCUMENTS

| | | | | |
|---|---|---|---|---|
| 3,996,708 A | * | 12/1976 | Frye .............................. | 52/157 |
| 4,152,882 A | * | 5/1979 | Howard ....................... | 56/13.7 |
| 4,170,099 A | | 10/1979 | Owens | |
| 4,442,659 A | * | 4/1984 | Enbusk ........................ | 56/12.7 |
| 5,040,360 A | | 8/1991 | Meehleder | |
| 5,226,284 A | | 7/1993 | Meehleder | |
| 5,303,532 A | * | 4/1994 | Phillips ....................... | 56/12.7 |
| 5,561,969 A | * | 10/1996 | Sandy .......................... | 56/13.6 |
| 5,694,752 A | * | 12/1997 | Warfield, III ................ | 56/13.6 |
| 5,802,824 A | * | 9/1998 | Aldrich ....................... | 56/13.7 |
| 5,809,758 A | * | 9/1998 | Flanigan et al. ............ | 56/13.7 |
| 6,032,443 A | | 3/2000 | Aldrich | |
| 6,094,896 A | | 8/2000 | Lane | |
| 6,301,863 B1 | | 10/2001 | Liebrecht | |
| 6,343,461 B1 | * | 2/2002 | Knott .......................... | 56/16.9 |
| 6,381,936 B1 | | 5/2002 | Lin | |
| 6,397,572 B1 | | 6/2002 | Roundy et al. | |
| 6,415,586 B1 | | 7/2002 | Park | |
| 6,457,301 B1 | | 10/2002 | Buss | |
| 6,474,053 B1 | | 11/2002 | Lund | |
| 6,484,484 B1 | | 11/2002 | Thomas | |
| 6,487,838 B2 | | 12/2002 | Handlin | |

* cited by examiner

Primary Examiner—Thomas B. Will
Assistant Examiner—Alicia Torres
(74) Attorney, Agent, or Firm—King & Schickli, PLLC

(57) ABSTRACT

A support for mounting a grass or weed trimmer to a deck of a riding mower or tractor includes a bracket for releasably and rotatably receiving a post, a telescoping post, and a cradle for releasably receiving and nesting with a trimmer shaft supported by the post. The cradle is mounted to the post by a spring, allowing front to back pivoting of the trimmer during use. In another aspect, the invention provides a trimming system comprising a trimmer mounted to a mower deck by the support as described.

19 Claims, 4 Drawing Sheets

TRIMMER CADDIE FOR MOWER DECK

This application claims the benefit of U.S. Provisional Patent Application Ser. Nos. 60/386,857, filed Jun. 10, 2002, 60/402,594 filed Aug. 12, 2002, and 60/426,787, filed Nov. 18, 2002.

TECHNICAL FIELD

The present invention relates to accessories for yard and garden care, landscaping, and the like. In particular, the present invention provides a support for a portable grass or weed trimmer, whereby the trimmer may be supported during use from a conventional mower deck of a riding lawn mower or tractor. More specifically, the present invention provides a mower deck-mounted support for use with a portable grass or weed trimmer which allows use of the trimmer during operation of the mower, or independently from the mower as needed.

BACKGROUND OF THE INVENTION

In the case where it is necessary to maintain large expanses of lawn or field, riding lawn mowers or tractors provide significant time savings. Similarly, it is known to use a portable grass or weed trimmer to trim weeds or grass from areas not accessible to a mower, such as for example near fence lines or trees. Both electric and gas powered trimmers are known in the art, which may cut grass or weeds using a nylon or other line, or alternatively a chain or blade arrangement when more heavy-duty cutting is required.

In the ordinary situation, the user will carry the portable grass trimmer to the worksite to complete the desired task, followed by the mowing operation using the riding mower or tractor. However, particularly in situations where significant use must be made of the trimmer, such as for example cutting along a lengthy fence line, using the conventional trimmer may become a back-breaking task. Walk-behind trimmers are known. However, significant physical exertion is still required of the user. There is accordingly identified a need in the art for devices allowing the use of the convenience of a riding mower or tractor in combination with the utility of a grass or weed trimmer. The device should be simple and easily retrofitted to a conventional riding mower or tractor, thereby obviating the need for purchasing additional expensive equipment to accomplish the desired tasks.

The present invention relates to a caddie or support for attaching a portable grass trimmer to the deck of a conventional riding mower or tractor. The apparatus allows use of the trimmer during operation of the riding mower, but also allows the trimmer to be used independently of the mower when desired. A grass or weed trimmer adapted for use with the caddie of the present invention is provided also.

SUMMARY OF THE INVENTION

In accordance with the purposes of the present invention as described herein, in one aspect a support for mounting a grass or weed trimmer having a cutting head, a shaft, and a handle to a mower deck is provided, comprising a post, a bracket for releasably and rotatably receiving a first end of the post to support the post in a substantially vertical orientation, pivoting means mounted to a second end of the post, a cradle for releasably supporting and nesting with the trimmer shaft, and at least one retainer for securing the trimmer shaft to the cradle. The post may be adapted for telescopically extending and retracting, and may comprise a first member and a second member with the second member being slidably receivable within the first member for telescoping. The post may further include locking means for preventing extension or retraction once a desired length thereof has been achieved.

The bracket for releasably and rotatably receiving the post may comprise a substantially U-shaped bracket having a horizontal top, at least two vertical side walls, and a platform oriented below and in parallel to the top. The top and platform include aligned apertures for receiving the post therethrough. It will be appreciated that when the post is inserted in the bracket whereby the post passes through the aligned apertures to rest on the mower deck, it will be rotatable within the bracket, allowing the trimmer to be concurrently rotated therewith. Accordingly, the apertures are sized in accordance with the diameter of the post, providing sufficient clearance between post and aperture wall to allow rotation without excessive play. Gravity and the weight of the support and trimmer maintain the post in the bracket during use.

Conveniently, the user need only lift the post to remove same from the mower deck to which the bracket is mounted. The bracket includes at least one flange extending in a horizontal orientation from a bottom end of a bracket side wall, each of said flanges including at least one aperture therethrough for receiving a bolt and thereby adapted for mounting the bracket to the mower deck. Accordingly, the bracket may be mounted to the mower deck by drilling apertures in the deck aligned with the apertures in the bracket flange, and securing the bracket to the mower deck using a bolt and cooperating screw. It will be appreciated, however, that any suitable means may be used for mounting the bracket to the mower deck, such as welding.

Typically, the pivoting means allows the trimmer attached to the support to be pivoted in a front to back manner. It will be appreciated that this feature desirably allows altering the trimmer orientation as desired, for example to clear an obstacle or to lengthen the trimming line on a "bump-feed" trimmer of a type well known in the art. The cradle is a surface adapted to releasably support and nest with the trimmer shaft. Thus, if the trimmer shaft is cylindrical, the cradle may be semi-circular in cross-section. If the trimmer shaft is square in cross-section, the cradle maybe correspondingly shaped in cross-section. The retainer may be separate from or integrally formed in the cradle material. The retainer may be a band of a type known in the art, such as for example a retainer having a worm-screw drive mechanism for tightening the band around the trimmer shaft and cradle to secure the trimmer to the cradle whereby free play between trimmer and cradle is substantially eliminated. It will be appreciated that as shown in FIG. 1, the cradle, post, and bracket are adapted to hold the trimmer shaft so that the shaft is not suspended from the support. The cradle may be secured to the pivoting means at any desired angle. In one embodiment, the cradle is supported at an angle of about 45 degrees relative to the post, providing an ergonomically correct positioning for the trimmer to a user seated on the mower or tractor. However, it will be appreciated that the cradle may be configured to support the trimmer at any desired angle, such that the cutting head of the trimmer is held at the desired orientation relative to the ground area which is to be trimmed. The user may therefore, by moving the trimmer handle in a desired direction move the cutting head from side to side or up and down.

In another aspect, a trimming system for attaching to a riding mower or tractor is provided, comprising a grass or weed trimmer having a cutting head, a motor for driving a cutting means contained in the cutting head, a shaft, and a handle, and a support as described above for mounting the trimmer to a mower deck of the mower or tractor. A power cord may be provided which is adapted for transferring an electrical current from the mower battery to the trimmer. However, it will be appreciated that other means for powering the trimmer are well suited to the present invention. For example, a trimmer having a rechargeable battery may be used. Alternatively, a gasoline engine powered trimmer may also be suitable. Similarly, a separate, dedicated battery may be supported by the mower for powering the trimmer. The trimmer of the present system may include a handle end having a substantially vertical terminus carrying a power switch. The switch allows transmission of an electrical current from the battery to the trimmer when biased in a first direction, and terminates transmission of electrical current from the battery to the trimmer when released.

As should be appreciated, a single embodiment is shown and described herein. That single embodiment is an illustration of one of the modes best suited to carry out the invention. It will be realized that the invention is capable of other different embodiments and its several details are capable of modification in various, obvious aspects all without departing from the invention. Accordingly, the drawings and descriptions will be regarded as illustrative in nature, and not as restrictive.

BRIEF DESCRIPTION OF THE DRAWINGS

The accompanying drawings incorporated in and forming a part of the specification, illustrate several aspects of the present invention and together with the description serve to explain the principles of the invention. In the drawings.

Reference will now be made in detail to the present preferred embodiment of the invention, an example of which is illustrated in the accompanying drawings.

DETAILED DESCRIPTION OF THE INVENTION

Figure 1:
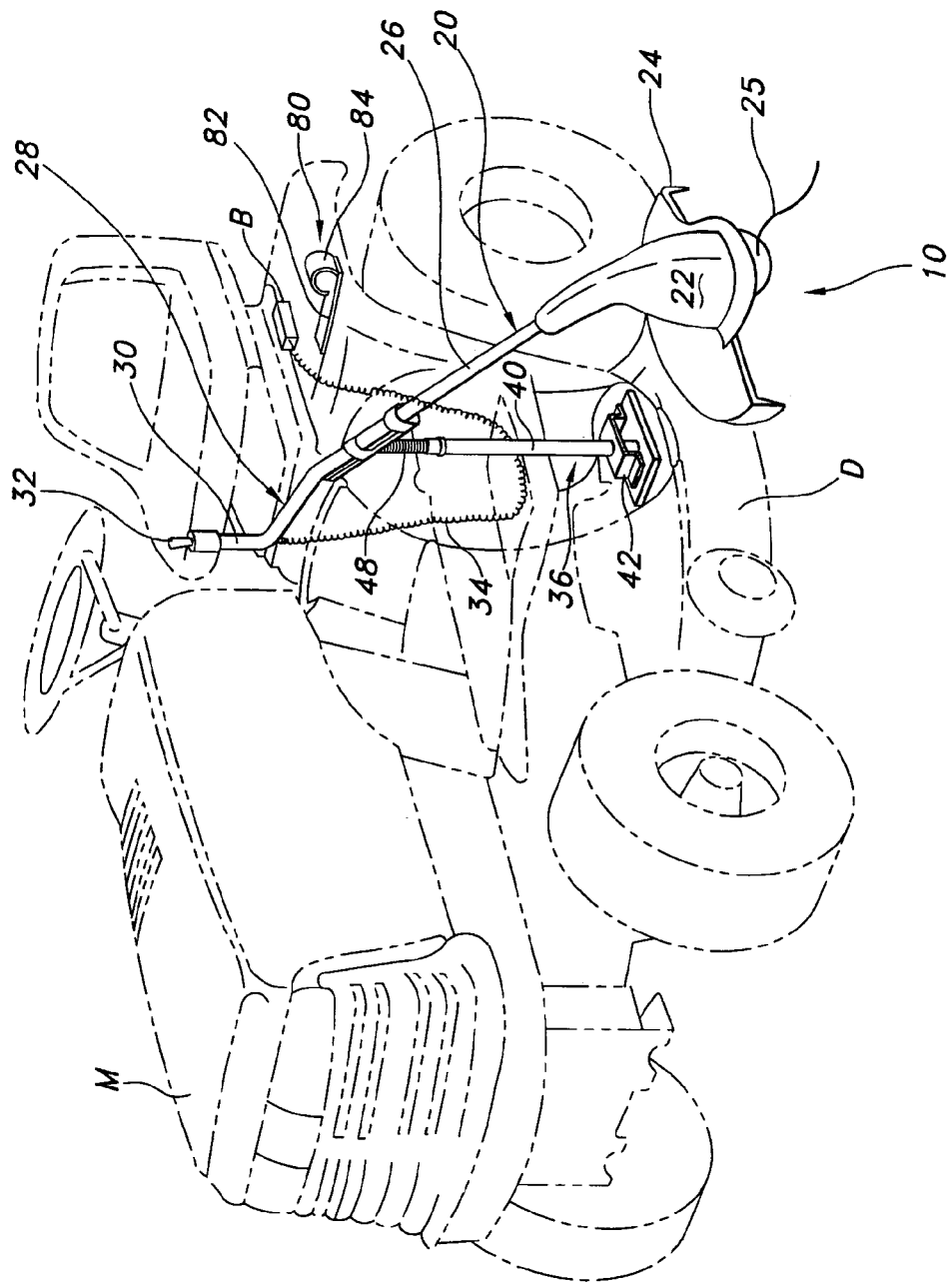
FIG. 1 is a perspective view showing the trimming system of the present invention mounted to the mower deck of a riding mower.
Figure 2:
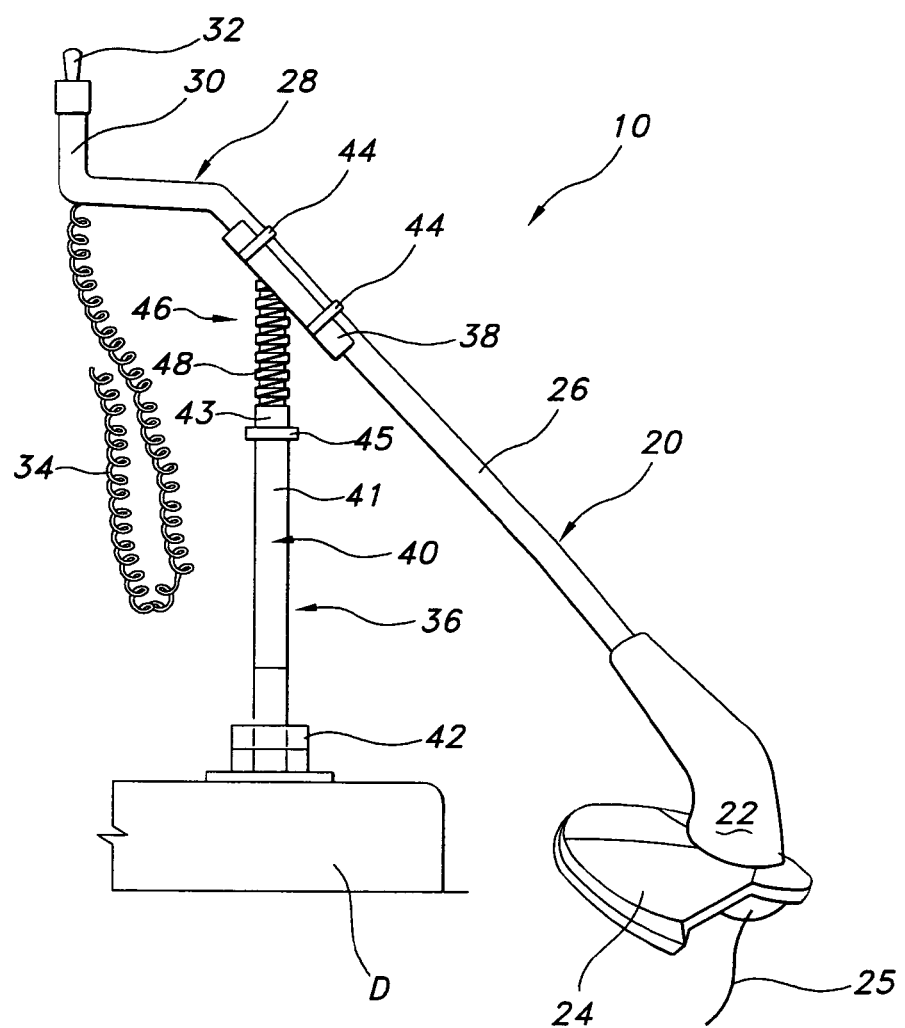
FIG. 2 is a side view of the trimming system of the present invention.

Reference is now made to FIG. 1 showing the trimming system of the present invention mounted to the mower deck D of a mower M. The trimming system of the invention, shown in isolation in FIG. 2, is generally designated by reference numeral 10. The system includes a trimmer 20 of a conventional design, having a cutting head 22 housing a motor (not shown), a shroud 24 for reducing the risk of incidental contact of the user with the cutting line or debris flung therefrom, a cutting line 25 of nylon or other suitable material, a shaft 26, and a handle 28. Of course, any suitable cutting means may be substituted for cutting line 25, such as a chain or blade (not shown). The handle 28 includes a substantially vertical portion 30 carrying a switch 32 for activating the trimmer. Switch 32 may be a momentary toggle switch of a type known in the art, which activates the trimmer 20 when biased in a first direction, and disables the trimmer 20 when released. A power cord 34 extends from handle 28 to a power source such as a battery B carried by the mower M (see FIG. 1).

The support 36 of the present invention comprises a cradle 38 for supporting the trimmer 20, a post 40, and a bracket 42. Cradle 38 includes at least one retainer 44 for securing the trimmer 20 to the cradle 38. In one embodiment shown in FIG. 4, retainer 44 is a metal band of a type known in the art, having a worm screw drive and screw (not shown) for tightening the retainer 44 around the cradle 38 and trimmer shaft 26 such that free play between cradle 38 and shaft 26 is substantially eliminated. However, it will be appreciated that any retainer providing the desired reduction in free play can be utilized. The cradle 38 will typically be supported on the post 40 at an angle of about 45 degrees relative to the substantially vertical orientation of post 40. It will be appreciated that this allows the trimmer 20 to be supported at an angle optimal for most conventional trimmer designs. However, any angle in accordance with the desired orientation of the cutting head 22 may be suitable. Retainer 44 may be integrally formed in cradle 38, or may be separate therefrom.

Post 40 may include a first member 41 and a second member 43, wherein second member 43 is telescopingly received in an interior of first member 41. A locking mechanism 45 may be provided to prevent extension or retraction of post 40 as desired. Any of a number of locking mechanisms 45 known in the art may be used, such as a twist-lock mechanism which frictionally arrests movement of second member 43 within first member 41, a series of slots at desired locations along first member 41 and a pin carried by second member 43 which rest in the slot at the desired height (not shown), and the like. Conveniently, this feature allows the user to adjust the height of post 40, and correspondingly the cutting height of the trimmer 20, as desired in accordance with the terrain encountered.

Figure 3:
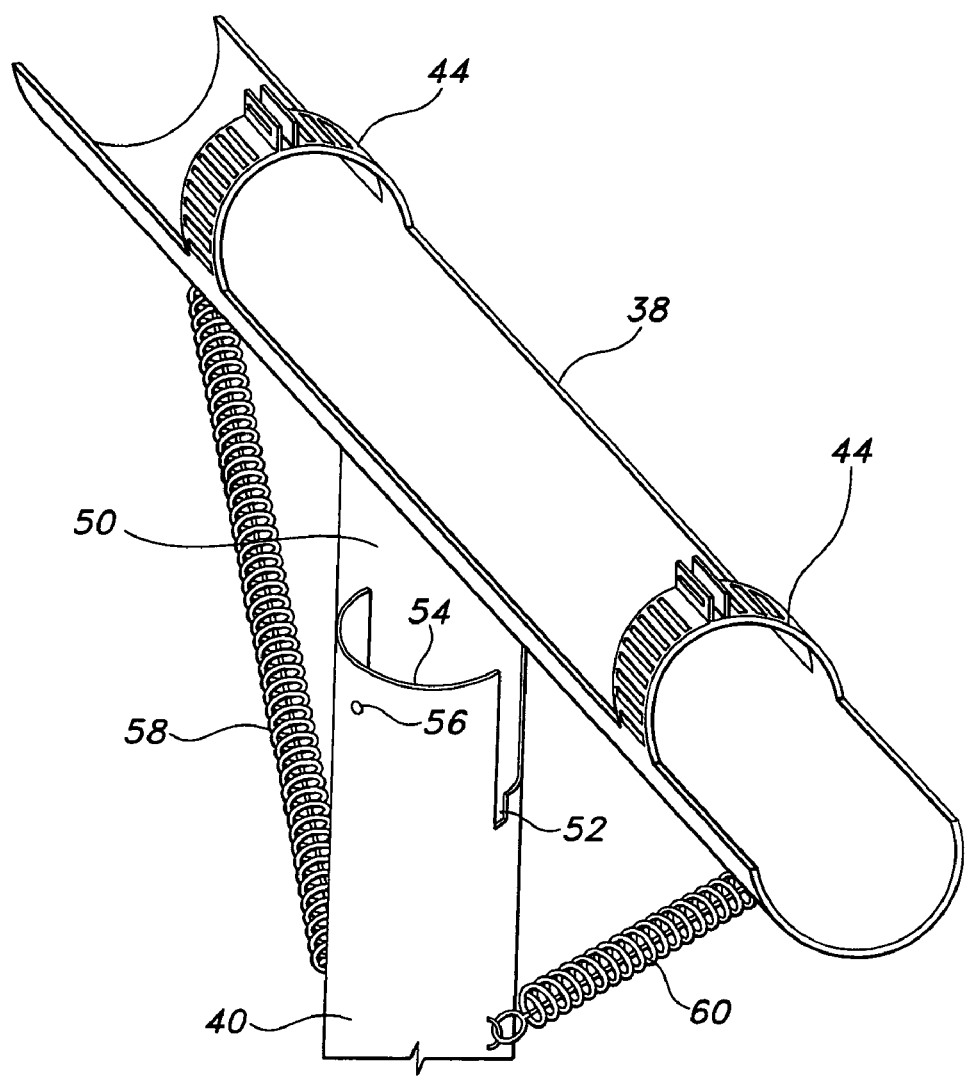
FIG. 3 shows the support of the present invention in isolation.

The post 40 is attached to the cradle 38 by a pivoting attachment 46. Typically, pivoting attachment 46 will be a coiled spring 48 as shown in FIGS. 1 and 2, connected (for example by welding) at a first end to post 40 and at a second end to cradle 38, which allows a trimmer secured to cradle 38 to be pivoted as desired to raise and lower cutting head 22. However, other structures are encompassed by the present invention. For example, referring to FIG. 3, pivoting attachment 46 may comprise a rocker fin 50 adapted to be received in a slot 52 in a top end 54 of post 40. A pin 56 passing through aligned apertures in top end 54 of post 40 and rocker fin 50 secures cradle 38 to post 40. A first keeper spring 58 and a second keeper spring 60, in accordance with the selected lengths thereof, preserve the desired angle of cradle 38 and thereby of trimmer 20.

It will be appreciated that the pivoting attachment 46 allows the cradle 38, and a trimmer 20 secured thereto, to be pivoted at least in a front to back manner. This feature allows the cutting head 22 to be raised or lowered by the user, for example to avoid an obstacle. Additionally, if trimmer 20 is of a type known in the art wherein the cutting line 25 is lengthened using a known "bump feed" mechanism, the need for the user to detach trimmer 20 from the support 36 is obviated.

Figure 4:
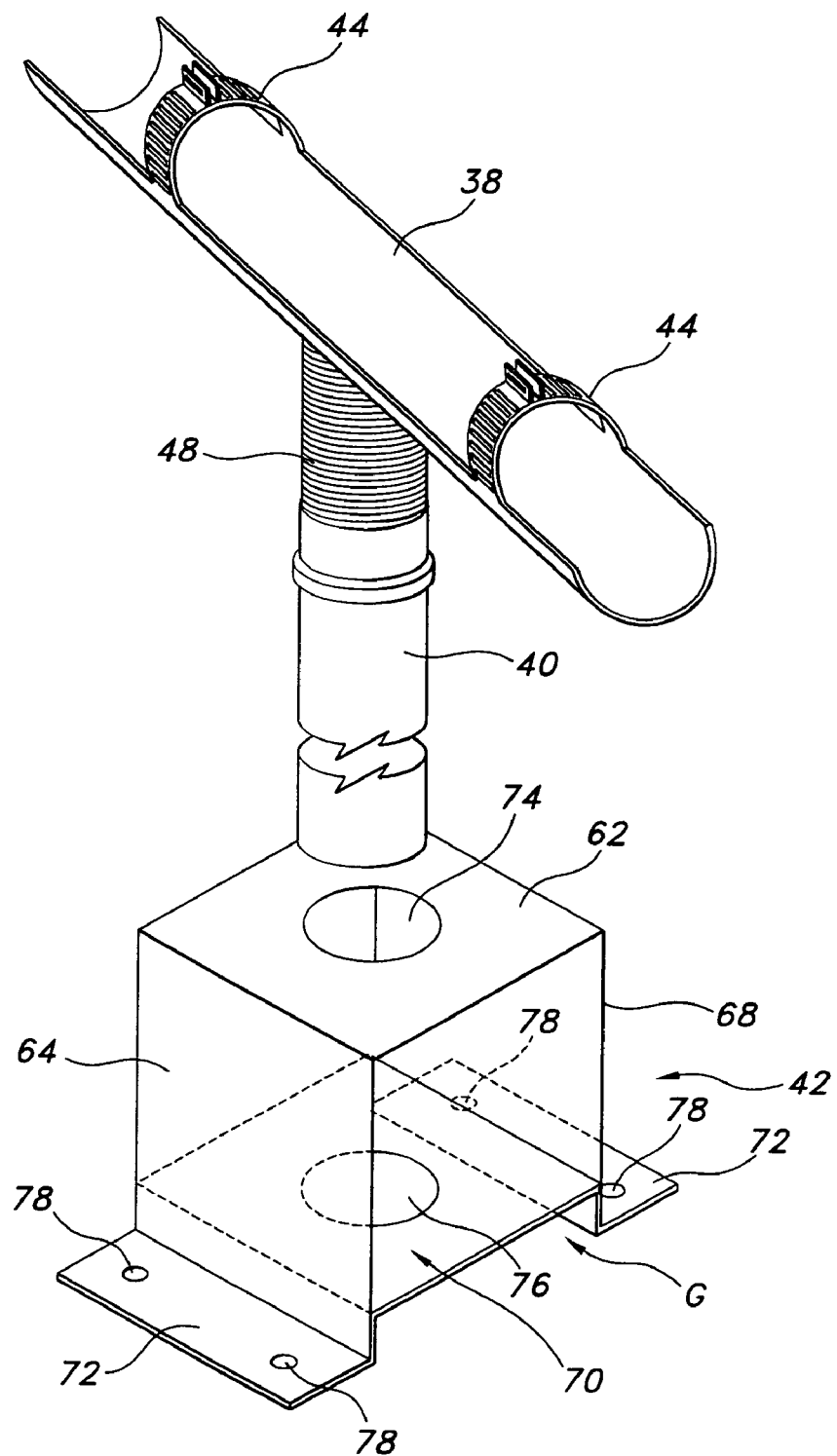
FIG. 4 shows a second embodiment of the support of the present invention, demonstrating an alternative pivoting means for attaching the trimmer cradle to the post.

Turning to FIG. 4, wherein the support 36 of the present invention is shown in isolation, bracket 42 comprises a top 62, side walls 64, 68, a platform 70 in spaced relationship below and parallel to top 62, and flanges 72 extending from a bottom edge of side walls 64, 68. Aligned apertures 74, 76 are provided through top 62 and platform 70, respectively for receiving post 40 therethrough. Flanges 72 include apertures 78 for receiving bolts (not shown) therethrough for bolting bracket 42 to a mower deck D as shown in FIG. 1. When bracket 42 is mounted to a mower deck D, a gap G remains between platform 70 and mower deck D. Aligned apertures 74, 76 provide sufficient clearance for post 40 such that post 40 is rotatable, without allowing excessive play. When post 40 is inserted through aligned apertures 74, 76, post 40 is retained in a substantially vertical orientation simply by gravity, the weight of the trimming system 10 supported by post 40, and frictional contact between post 40 and aligned apertures 74, 76 of bracket 42. Aligned aperture 74 may be of a greater diameter relative to aperture 76. In this embodiment, the bottom end of post 40 may include a narrowed terminus forming a surface which rests on platform 70. Alternatively, aligned apertures 74,76 maybe of substantially equal diameters, and a bottom end of post 40 may simply rest on an upper surface of mower deck D. Accordingly, a simple, effective means is provided for mounting a trimmer 20 to a mower deck D, which does not required complicated attachment systems or the permanent mounting of the trimmer 20 to the deck D. Accordingly, a simple, effective means is provided for mounting a trimmer 20 to a mower deck D, which does not required complicated attachment systems or the permanent mounting of the trimmer 20 to the deck D.

In use, it will be appreciated that the user simply bolts bracket 42 to mower deck M, inserts post 40 through aligned apertures 74, 76 of bracket 42, and secures the trimmer 20 to the cradle 38 using retainers 44. Power cord 34 is attached to the terminals of mower battery B (see FIG. 1) to provide power to the trimmer 20. However, it will be appreciated that other configurations are possible. For example, a trimmer 20 having a gas-powered engine could be used, or a trimmer 20 having a self contained battery pack could be employed. Such devices are well known in the art. Alternatively, a second, independent battery (not shown) could be supported by mower M. In still yet another embodiment, mower M may carry a dedicated power socket (not shown) and power cord 34 may terminate in an adaptor configured to plug into the power socket. Such devices are known in the art. For example, in the automotive industry it is known to provide power cords having adaptors for powering various devices from an auto dashboard-mounted cigarette lighter or other supplemental power socket.

The user then may cause mower M to travel along the desired cutting path, and activate trimmer 20 using switch 32. Pivoting attachment 46 allows the user to raise and lower the cutting head 22 of trimmer 20 as needed to clear obstacles. The pivoting feature provides further advantages. For example, in the case of a trimmer 20 having a bump feed mechanism for extending line 25, the user may pivot the trimmer to tap the bump feed mechanism and extend line 25 without necessitating disconnection of trimmer 20 from mower deck D.

In the event an area to be cut is in a location inaccessible to the mower M, the user need only stop the mower M, detach trimmer 20, for example by releasing retainers 44 or by simply disengaging post 40 from bracket 42, and carry the trimmer 20 to the desired site. Power cord 34 provides sufficient play to allow the user to use trimmer 20 at a predetermined distance from the mower M. Once the inconvenient area has been trimmed, the user need only reattach trimmer 20 to mower M as described above, and resume normal operation.

Once the user has completed the trimming/mowing operation, the trimmer 20 may be rotated to a storage position and secured to the mower at a second point using a capture bracket depicted in FIG. 1 as reference numeral 80. The capture bracket 80 may include a sliding bracket 82 and a strap 84 for capturing shaft 26 of trimmer 20. Strap 84 may include a tongue and buckle, hook and loop securing means, or any suitable means for capturing shaft 26.

The foregoing description of the preferred embodiment of this invention has been presented for purposes of illustration and description. It is not intended to be exhaustive or to limit the invention to the precise form disclosed. Obvious modifications or variations are possible in light of the above teachings. For example, while an electrically powered trimmer is described herein, a gas-powered trimmer could easily be substituted. The above-described embodiment discloses powering the trimmer from a mower battery. However, a dedicated battery could also be provided. Still further, other lawn care and landscaping accessories may be adapted to the caddie of the present invention, such as edgers and the like.

The embodiment was chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally, and equitably entitled.

What is claimed is:

1. A support for mounting a grass or weed trimer having a cutting head, a shaft, and a handle to a mower deck, comprising:
   a post;
   a bracket for releasably and rotatably receiving a first end of the post to support the post in a substantially vertical orientation, said bracket having a horizontal top, at least two vertical side walls, and a platform oriented below and in parallel to the top with said top and platform having aligned apertures for receiving the post therethrough and further wherein the bracket includes at least one flange extending in a horizontal orientation from a bottom of a bracket side wall, said flange including at least one aperture therethrough for receiving a bolt and thereby adapted for mounting the bracket to a mower deck;
   pivoting means secured at a first end to a second end of the post and at a second opposed end to a cradle for releasably supporting and nesting with the trimmer shaft; and
   at least one retainer for securing the trimmer shaft to the cradle;
   said cradle, post and bracket being adapted for holding the trimmer shaft whereby the trimmer shaft is not suspended from the support.

2. The apparatus of claim 1, wherein the post comprises a first member and a second member, said second member being slidably receivable within said first member for telescoping, and further including locking means for preventing extension or retraction of the post once a desired length thereof has been achieved.

3. The apparatus of claim 1, wherein the pivoting means is a coiled spring.

4. The apparatus of claim 1, wherein the cradle is a surface adapted to releasably support and nest with the trimmer shaft.

5. The apparatus of claim 4, wherein the cradle is semi-circular in cross-section.

6. The apparatus of claim 4, wherein the cradle is secured to the pivoting means such that the cradle is supported at an angle of about 45 degrees relative to the post.

7. The apparatus of claim 1, wherein the retainer is separate from the cradle, and includes means for tightening the retainer around the trimmer shaft and cradle whereby free play between shaft and support is substantially eliminated.

8. The apparatus of claim 1, wherein the retainer is at least one band integrally formed with the cradle, said band including means for tightening the retainer around the trimmer shaft.

9. A trimming system for attaching to a riding mower or tractor, comprising:
- a grass or weed trimmer having a cutting head, a motor for driving a cutting means contained in the cutting head, a shaft, and a handle; and
- a support for mounting the trimmer to a mower deck of the mower or tractor, the support including:
  - a post;
  - a bracket for releasably and rotatably receiving a first end of the post to support the post in a substantially vertical orientation, said bracket having a horizontal top, at least two vertical side walls, and a platform oriented below and in parallel to the top with said top and platform having aligned apertures for receiving the post therethrough and further wherein the bracket includes at least one flange extending in a horizontal orientation from a bottom of a bracket side wall, said flange including at least one aperture therethrough for receiving a bolt and thereby adapted for mounting the bracket to a mower deck;
  - pivoting means secured at a first end to a second end of the post and at a second opposed end to a cradle for releasably supporting and nesting with the trimmer shaft; and
  - at least one retainer for securing the trimmer shaft to the cradle;
  - said cradle, post and bracket being adapted for holding the trimmer shaft whereby the trimmer shaft is not suspended from the support.

10. The system of claim 9, wherein the trimmer includes a power cord adapted for transferring an electrical current from a battery carried by said mower to the trimmer.

11. The system of claim 10, wherein the trimmer handle includes a substantially vertical terminal member carrying a power switch, said switch allowing transmission of the electrical current from the mower battery to the trimmer when biased in a first direction, and terminating transmission of electrical current from the battery to the trimmer when released.

12. The system of claim 9, wherein the post comprises a first member and a second member, said second member being slidably receivable within said first member for telescoping, and further including locking means for preventing extension or retraction of the post once a desired length thereof has been achieved.

13. The system of claim 9, wherein the pivoting means is a coiled spring.

14. The system of claim 9, wherein the cradle is a surface adapted to releasably support and nest with the trimmer shaft.

15. The system of claim 14, wherein the cradle is semi-circular in cross-section.

16. The system of claim 15, wherein the cradle is secured to the pivoting means such that the cradle is supported at an angle of about 45 degrees relative to the post.

17. The system of claim 9, wherein the retainer is separate from the cradle, and includes means for tightening the retainer around the trimer shaft and cradle whereby free play between shaft and support is substantially eliminated.

18. The system of claim 9, wherein the retainer is at least one band integrally formed with the cradle, said band including means for tightening the retainer around the trimmer shaft.

19. The system of claim 9, further including a capture bracket secured to a surface of the mower or tractor for capturing the trimmer shaft in a storage position when not in use.

* * * * *